US006889099B2

United States Patent
Heidel et al.

(10) Patent No.: US 6,889,099 B2
(45) Date of Patent: May 3, 2005

(54) DISTRIBUTED CONTROL SYSTEM AND AN ASSOCIATED SYSTEM COMPONENT FOR THE DISTRIBUTED CONTROL SYSTEM

(75) Inventors: Roland Heidel, Kandel (DE); Udo Doebrich, Karlsbad (DE)

(73) Assignee: Siemens Aktiengesellschaft, Munich (DE)

( * ) Notice: Subject to any disclaimer, the term of this patent is extended or adjusted under 35 U.S.C. 154(b) by 430 days.

(21) Appl. No.: 09/880,015

(22) Filed: Jun. 14, 2001

(65) Prior Publication Data

US 2002/0023188 A1 Feb. 21, 2002

Related U.S. Application Data

(63) Continuation of application No. PCT/DE99/03956, filed on Dec. 10, 1999.

(30) Foreign Application Priority Data

Dec. 14, 1998 (DE) .......................................... 198 57 649

(51) Int. Cl.[7] .............................................. G05B 19/18
(52) U.S. Cl. ............................... 700/56; 700/1; 700/64; 700/69
(58) Field of Search ............................. 700/95, 96, 97, 700/98, 99, 100, 1, 56, 64, 69; 710/305, 1, 5, 65

(56) References Cited

U.S. PATENT DOCUMENTS

| | | | | |
|---|---|---|---|---|
| 4,998,206 A | * | 3/1991 | Jones et al. ................... | 700/96 |
| 5,485,161 A | | 1/1996 | Vaughn ....................... | 342/357 |
| 5,519,878 A | | 5/1996 | Dolin, Jr. .................... | 395/800 |
| 5,586,305 A | * | 12/1996 | Eidson et al. ................. | 700/28 |
| 5,751,576 A | * | 5/1998 | Monson ....................... | 700/83 |
| 5,896,292 A | * | 4/1999 | Hosaka et al. ............... | 700/108 |
| 6,473,664 B1 | * | 10/2002 | Lee et al. .................... | 700/110 |

FOREIGN PATENT DOCUMENTS

| | | | |
|---|---|---|---|
| DE | 195 09 836 A1 | 9/1995 | .......... G05B/15/02 |
| DE | 195 14 223 A1 | 10/1996 | .......... A01D/91/00 |
| DE | 196 24 929 A1 | 1/1998 | .......... G05B/15/00 |
| EP | 0 850 748 A2 | 7/1998 | .......... B29C/65/34 |
| JP | 10-69304 | 3/1998 | .......... G05B/15/02 |

OTHER PUBLICATIONS

Boettcher, Joerg et al., Methoden des Fernzugriffs auf Feldbus–basierte Systeme, etz Automatisierungs–technik, vol. 7–8/1998, pp. 8–13.

* cited by examiner

*Primary Examiner*—Leo Picard
*Assistant Examiner*—Charles R Kasenge
(74) *Attorney, Agent, or Firm*—Sughrue Mion, PLLC

(57) ABSTRACT

A distributed control system having system components (1, 2, 3). The positions of the system components (1, 2, 3) are stored in respective memories (11, 12, 13) as component-specific data, which represent the spatial coordinates of the positions. The system components (1, 2, 3) transmit their respective positions to a configuration unit (4) via a communications channel (5). By means of a layout plan, e.g., in the form of a piping and installation diagram, the component-specific data of the individual system components (1, 2, 3) is assigned to the configured system components. In addition, a respective physical address is assigned to each of the system components (1, 2, 3). This achieves simple and reliable configuration of the system components (1, 2, 3). The distributed control system is used, in particular, in process apparatuses.

13 Claims, 1 Drawing Sheet

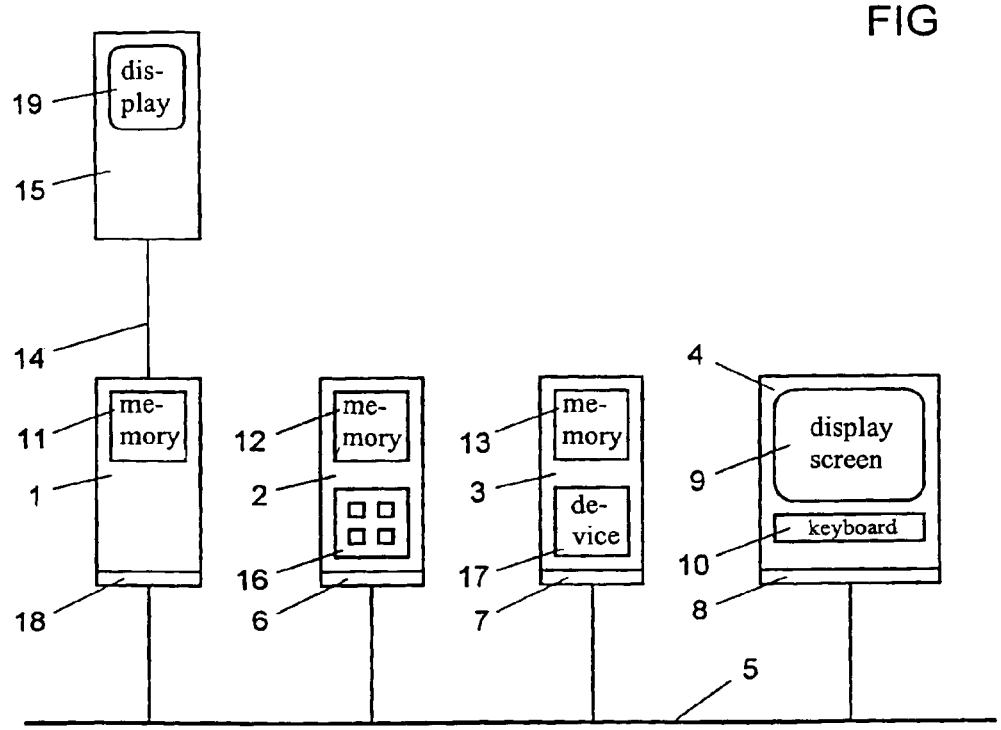
FIG

DISTRIBUTED CONTROL SYSTEM AND AN ASSOCIATED SYSTEM COMPONENT FOR THE DISTRIBUTED CONTROL SYSTEM

This is a Continuation of International Application PCT/DE99/03956, with an international filing date of Dec. 10, 1999, which was published under PCT Article 21(2) in German, and the complete disclosure of which is incorporated into this application by reference.

FIELD OF AND BACKGROUND OF THE INVENTION

The present invention relates to a distributed control system, in particular for implementing an automation system. Furthermore, the present invention relates to a system component for such a distributed control system.

German Patent DE 196 24 929 A1 discloses a distributed control system, in which sensors and actuators are connected to a configuration unit via a bus system. Therein, the bus system is configured as a communications channel. In the configuration unit, an operating and monitoring interface is generated. In this reference, several possibilities for configuring and operating the distributed control system are described. A technically simple but costly and unreliable option is to program the system components individually and to generate, separately therefrom, a layout plan by means of the configuration unit. This layout plan includes information on the function and the position of the components within the system. To reduce the programming cost, the reference proposes to provide each of the system components with a memory, which stores component-specific data. In this memory, the corresponding function of the system components, such as controllers, and their integration into the automation system, can be stored. The integration of a component into the automation system is described by the addresses of other system components, with which the respective component interacts. In the case of a controller, these addresses are the addresses of the setpoint generator and the actual value sensor from which the controller receives its input values. Furthermore, these addresses include the address of the actuator, which is controlled by the controller. This component-specific data is transmitted from the system components to the configuration unit via the data bus. Based on this data, the configuration unit automatically generates an operating and monitoring interface. A drawback of this option is that the programming of the individual system components is relatively costly.

U.S. Pat. No. 5,519,878 proposes another distributed control system. To implement the distributed control system, a configuration unit requests a unique identifier for a system component prior to installation of that system component. This unique identifier is printed on an adhesive label as a barcode, which is then, on site, affixed on a layout plan at the position of the system component. This layout plan is in paper form and reflects the spatial positions of the system components within the system. The configuration unit is equipped with a display screen to display the layout plan and with a reading device to automatically read in the barcode. The barcode, which reflects the unique identifier of a system component, is automatically read in by the reading device, and is, based on the displayed layout plan, assigned to the corresponding position of the system component in the graphic display. The identifiers of the individual system components are used to configure a network, which interconnects the system components for data transmission purposes. The drawback is that affixing the adhesive labels to the paper layout plan and assigning the unique identifiers to the individual system components on the display screen must be done manually. Therefore, this method is subject to errors.

OBJECTS OF THE INVENTION

It is one object of the present invention to provide a distributed control system and a system component for such a system, which can be configured in a simple manner while the reliability of the configuration is improved as compared to the prior art.

SUMMARY OF THE INVENTION

This and other objects of the present invention are achieved by a distributed control system that includes a plurality of system components, a configuration unit, and a communications channel. The system components have respective memories to store component-specific data that include spatial coordinates of the positions of the system components.

The configuration unit has an input device to input or generate a layout plan that includes information on the positions of the system components within the distributed control system.

The communications channel connects the system components and the configuration unit to mutually exchange data. Therein, the system components transmit their positions in the form of the component specific data to the configuration unit. The configuration unit assigns and transmits unique physical addresses on the communications channel to the system components whose respective positions were previously received by the configuration unit as the component-specific data.

Advantageous embodiments of the distributed control system and of the system components suitable for such a distributed control system are set forth in the dependent claims.

It is an advantage of the invention that the transmission of the position of the individual system components as component-specific data (which represent the spatial coordinates) provides a unique identification of the system components in that these data act as identifiers. It is not possible to assign identical component specific data to two different system components since the spatial coordinates always differ. This results in an improved reliability during configuration of the system components. Since the spatial coordinates of the system components are transmitted to the configuration unit via the communications channel, manual multiple data entry is eliminated, and thus, data consistency is ensured. The component-specific data, which uniquely identifies the corresponding system component, permits, in a simple manner, an automatic assignment of unique addresses in the configuration unit.

If the system components are equipped with a unit for automatically determining their positions, in particular with a GPS (Global Positioning System) receiver, no operator is involved in determining the spatial coordinates at all. In other words, the potential for erroneous manual data entry is completely eliminated. In cases where the costs of equipping the system components with such a device are prohibitive, the system components can be provided, in an inexpensive manner, with a device for entering their positions. In this case, the data can be manually entered or by data transmission via an interface. Advantageously, the spatial coordinates of the positions of the system coordinates are automatically determined by a portable device, which can, again, include a GPS receiver.

Advantageously, the configuration unit is provided with a layout plan generator, which generates a layout plan, preferably in the form of a piping and installation diagram, and which contains information on the spatial positions of the system components. If, in addition, the configuration unit is configured to assign and to transmit a unique physical address on the communications channel to a system component whose position was previously received by the configuration unit in the form of the component specific data, the unique identification of the system components through their spatial coordinates can advantageously be used for assigning the unique addresses. Thus, it is not necessary to program or to set the addresses in the individual components or in the configuration unit. To code the addresses thus generated by the configuration unit, smaller data volumes than those for coding the spatial positions are sufficient. Thus, shorter addresses can be advantageously used for communications during the subsequent operation of the system.

BRIEF DESCRIPTION OF THE DRAWINGS

The invention and further advantageous refinements of the invention according to the features of the dependent claims are explained in more detail below with the aid of diagrammatic, exemplary embodiments in the single drawing.

DETAILED DESCRIPTION OF THE PREFERRED EMBODIMENTS

The FIGURE shows a distributed control system having system components 1, 2 and 3 and a configuration unit 4, which are interconnected by a bus 5. The bus 5 is configured as a communications channel for data transmission purposes. For communication purposes, the system components 1, 2, 3 and the configuration unit 4 have respective communications devices 18, 6, 7 and 8. The system components 1, 2 and 3 are, for instance, an actual value sensor, a controller, and an actuator, respectively. The configuration unit 4 configures the communication between the individual components. Therein, the configuration unit can be implemented by a powerful personal computer, on which, as a software tool, a suitable program is installed for generating a piping and installation diagram in the form of a layout plan. The layout plan includes information on the function and the spatial position of the components within the system. Preferably, the layout plan is displayed on a display screen 9 of the configuration unit 4. The entries required to generate the layout plan can be made by means of a keyboard 10.

The system components 1, 2 and 3 include respective memories 11, 12 or 13 to store component-specific data. The component-specific data stored in the memories 11, 12 and 13 is data representing the spatial coordinates of the respective system components 1, 2 or 3. Other component-specific data can be the function designation, i.e., for instance, actual value sensor, controller, or actuator; the physical bus address; the integration in the distributed control system; information on the respective device type; the manufacturer; or the like. A portable device 15 is connected to the system component 1 via an interface 14. The portable device 15 has a device for determining the spatial position of the system component 1 and for writing data, which represent the spatial coordinates, into the memory 11 of the system component 1 via the interface 14. Instead of the interface 14, the system component 2 has a keyboard for manually entering the spatial coordinates, which were previously determined by e.g. the portable device 15 and which were read from a display 19. The system component 3 is equipped with a device 17 for automatic position determination, so that no manual entry and no additional portable device is required to write the component specific data into the memory 13.

Upon system startup, the system components 1, 2 and 3 each transmit a telegram, which contains the component-specific data of the memories 11, 12 or 13, to the configuration unit 4 via the communications channel 5. In this phase, a predefined broadcast telegram, for example, can be sent to the configuration unit 4. Advantageously, in order to increase availability, several configuration units can be provided on the communications channel, which coordinate their activities among one another. This provides redundancy of the configuration unit 4. Another option is to assign a predefined address for the configuration unit 4. The configuration unit 4 includes a previously generated layout plan with information on the function and the spatial position of the components. Alternatively, the layout plan can be generated on another device and can be entered into the configuration unit 4 via an interface (not depicted). Via the spatial coordinates, the component-specific data in the telegrams is assigned to the components configured in the layout plan. Advantageously, the spatial coordinates allow a unique identification of the individual components.

Mobile devices, which are not included in the layout plan with fixed coordinates, have a corresponding identifier in the component-specific data. For such components, the configuration unit 4 includes a dynamic layout plan.

The configuration unit 4 generates a physical address for each system component by means of which the respective system component can be addressed on bus 5. Alternatively, it is of course also possible to assign the addresses manually. Via reply messages, the addresses are communicated to the individual system components. During subsequent operation of the distributed control system, only the physical addresses are used for addressing.

The device 17 for automatically determining the position of the system component 3 includes, for example, a GPS receiver. In cases where the receiving conditions for the satellite signals are poor, e.g., due to shielding by building parts, additional GPS signal generating transmitters, which simulate the GPS, can be installed in the area of the distributed control system. This has the advantage that commercially available GPS receivers can be used without having to make extensive technical modifications.

Alternatively, the individual system components can emit locating signals, which a locating system that is disposed in the area of the distributed control system evaluates by taking a cross bearing. The determined position coordinates are then written into the memories of the individual system components, either via a radio link corresponding to the interface 14 or by manual entry using the keyboard 16. In the embodiments described above, the bus 5 is used as a communications channel. However, it is only necessary for the invention that the system components can be connected to a communications channel, i.e., that they can exchange data with one another. Therefore, the communication can be e.g. wire-bound or fiber optic. The communication can also be effected via radio links or infrared links.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A distributed control system, comprising:
   system components comprising at least a first system component and a second system component, the system components having respective memories to store component-specific data that include spatial coordinates of respective positions of the system components;
   a configuration unit having an input device for at least one of inputting and generating a layout plan that includes at least information on the respective positions of the system components within the distributed control system; and
   a communications channel, to which the system components and the configuration unit are connected to mutually exchange data;
   wherein the system components are configured to transmit the respective positions of the system components as the component-specific data to the configuration unit; and
   wherein the configuration unit is configured to assign and transmit unique physical addresses on the communications channel to the system components whose respective positions were previously received by the configuration unit as the component-specific data such that the first system component receives an assigned unique physical address in response to a respective position transmitted from the first system component.

2. The distributed control system of claim 1, wherein the distributed control system is configured for implementation in an automation system.

3. The distributed control system of claim 1, wherein the system components are selected from the group consisting of controllers, actual value sensors, and actuators.

4. The distributed control system of claim 1, wherein at least one of the system components comprises a device for automatically determining the position of the at least one of the system components.

5. The distributed control system of claim 4, wherein the device comprises a GPS receiver.

6. The distributed control system of claim 1, wherein at least one the system components has a device for entering the position of the at least one of the components.

7. The distributed control system of claim 1, wherein the configuration unit comprises a generator of the layout plan, wherein the layout plan includes, in form of a piping and installation diagram, information on the respective positions of the system components.

8. A system component for a distributed control system, the system component comprising:
   a memory to store component-specific data representing spatial coordinates of a position of the system component; and
   a communications device connected to a communications channel;
   wherein the system component is configured to transmit the position of the system component, as the component-specific data, to the communications device via the communications channel; and
   wherein the system component is configured to receive a unique physical address assigned by the configuration unit via the communications channel.

9. The system component of claim 8, wherein the system component is selected from the group consisting of controllers, actual value sensors, and actuators.

10. A method, comprising:
    determining positions of respective system components of a distributed control system;
    storing the positions in respective memories of the system components;
    transmitting the positions to a configuration unit of the distributed control system;
    generating a layout plan of the distributed control system, wherein the layout plan includes at least information on the respective positions of the system components within the distributed control system; and
    assigning and transmitting unique physical addresses on the communications channel to the system components such that a system component receive a unique physical address in response to a spatial position transmitted from the system component.

11. The method of claim 10, wherein the positions of the respective system components are automatically determined.

12. The distributed control system according to claim 1, wherein each of said system components contains a respective memory.

13. The distributed control system according to claim 12, wherein each of said system components stores in the respective memory a respective physical location of its system component in spatial coordinates.

* * * * *